Figure 4:
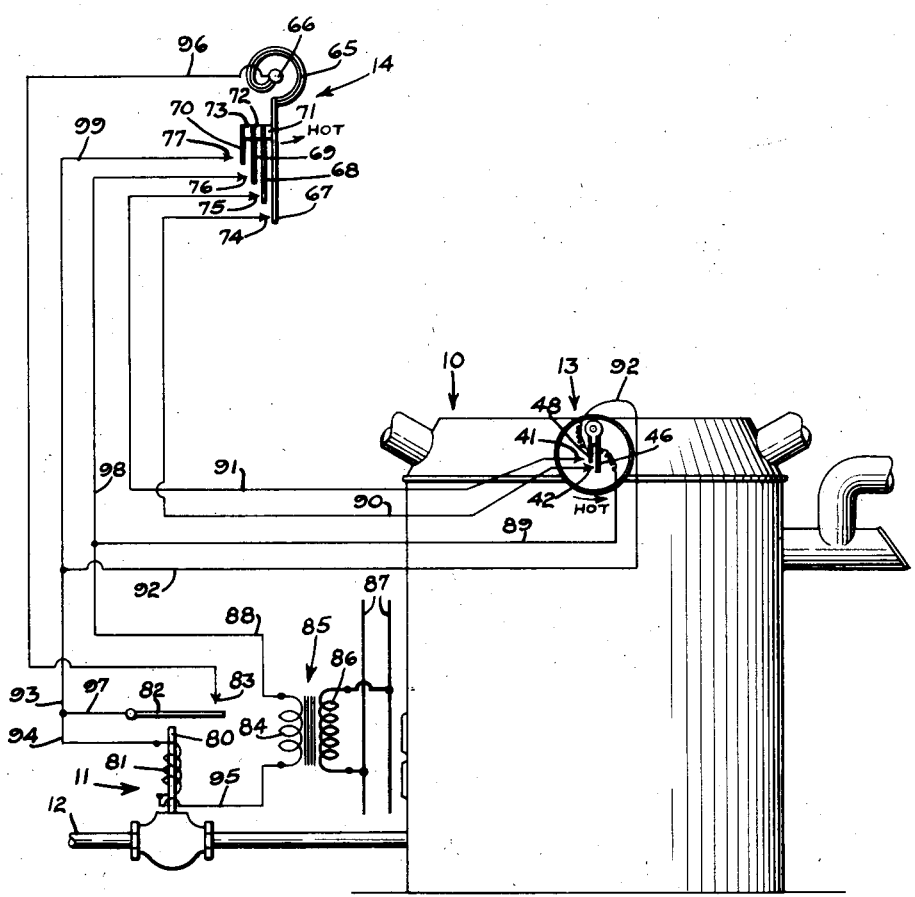

Feb. 23, 1937.  T. F. CAMPBELL  2,072,025
TEMPERATURE CONTROLLING SYSTEM
Filed May 7, 1934   2 Sheets-Sheet 1
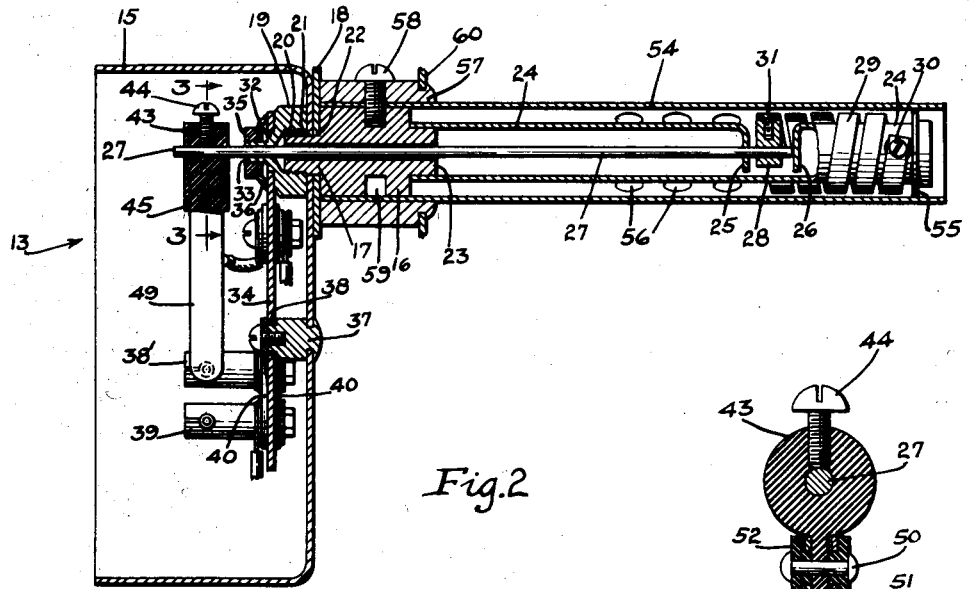
INVENTOR
THOMAS F. CAMPBELL
BY
ATTORNEY Patented Feb. 23, 1937

2,072,025

UNITED STATES PATENT OFFICE 2,072,025

TEMPERATURE CONTROLLING SYSTEM

Thomas F. Campbell, Penn Township, Allegheny County, Pa., assignor to Minneapolis-Honeywell Regulator Company, Minneapolis, Minn., a corporation of Delaware Application May 7, 1934, Serial No. 724,400

3 Claims. (Cl. 236—9)

The present invention relates to the automatic control of a condition or force such, for example, as the temperature of an enclosed space to be heated.

In a heating system, for example, where the space is heated by means of a circulating fluid, such as warm air, hot water or steam which is circulated to the space by means of ducts or pipes and is heated by a furnace or boiler under the command of a thermostatic device responsive to the space temperature, it is well-known that there is a lag between a call for heat at the thermostat and actual delivery of heat to the space since it requires a certain amount of time to impart heat to the circulating fluid and deliver that heat to the space. Similarly, when the thermostat becomes satisfied, the circulating fluid may be heated to a high degree, and although no further heat is imparted to it by the furnace or boiler, it is still capable of delivering and does deliver further heat to the space with the result that the space is heated considerably above that temperature at which the thermostat became satisfied. As a result, the actual space temperature fluctuations are considerably greater than intended or desired. In other words, the control system does not give the closeness of control which it is desired or necessary to maintain.

The principal object of the present invention is the provision of a simple automatic control system by means of which the value of a condition or force can be maintained within very small limits.

One manner of overcoming the difficulties above pointed out is by breaking up the heating of the circulating fluid during the time that the space temperature is such as to normally result in heating the fluid, so that as the heat content of the fluid is increased, there will be delays interposed during which time this heat can be delivered by the heating fluid to the space in an attempt to restore the space temperature. If this be done, the heat content of the fluid at the time the space temperature is restored is much lower than it would be if the fluid had been continuously heated all the time that the space temperature responsive thermostat was calling for heat. Various methods of breaking up the heating of a circulating fluid have been heretofore suggested, such as by the use of a mechanical timer. While these methods of breaking up the heating of a circulating fluid have resulted in an improved operation of the heating system and a closer control of the space temperature, they are not entirely perfect since such mechanical timing has no relation to the actual heat stored up in the heating system as, for instance, the content of the heating fluid or the demand for heat under varying weather conditions. The present invention contemplates breaking up the delivery of heat to the heating system during the time that the space temperature is below the desired value in response to changes in the heat stored up in the system, as compared with the use of a timer for this puropse.

Thus, it is an object of the invention to provide an automatic control system for controlling the value of a condition or force in which a condition or force changing means is operated intermittently, in response to changes in the amount of energy stored up in the means for transmitting such condition or force to the object of application, during the time that the value of the condition or force is such as to require a corrective measure.

In order to obtain the best results under varying load or demand conditions, it has been found desirable to have the interrupting means respond to predetermined changes in said amount of stored energy rather than to the amount itself. In other words, the device or mechanism which responds to the amount of stored energy should be self-adjusting. This can be simply accomplished by connecting the element responsive to the stored energy of the condition or force changing means to the device which it controls through any of the now well-known friction slip connecting mechanisms whereby the value at which said element will operate the controlled device will vary.

Another object of the invention is the provision of an automatic control system for controlling the value of a condition or force which includes a device responsive to the value of the condition or force to be controlled and an interconnected or associated self-adjusting mechanism which responds to changes in the value of the stored energy of the condition or force changing means.

In a heating system, the main controlling device takes the form of a space temperature responsive thermostat and the self-adjusting mechanism takes the form of a slip-friction mechanism responsive to any desired condition more directly produced by the heating means, such as the temperature of the circulating fluid or of the heater itself.

Under certain conditions, where the value of the condition or force deviates too far from the desired value, it may be desirable to operate the condition or force changing means continuously until the value of the condition or force has been partially restored in order to return the value of the condition or force substantially to the desired value in a shorter time than would be possible by intermittent operation, and to thereafter operate the condition or force changing means intermittently in the manner heretofore described until the value of the condition or force is completely restored.

Accordingly, it is another object of the invention to provide an automatic system for controlling the value of a condition or force in which a condition or force changing means is operated continuously at maximum capacity when the condition or force is at one value, is operated at minimum capacity or rendered inoperative when the condition or force is at another value, and is operated intermittently under the control of a device or mechanism responsive to changes in the stored energy of the condition or force changing means when the condition or force is at an intermediate value between said first and second values.

Other objects of the invention will be found in the following detailed description, the accompanying drawings and the appended claims.

In the drawings,

Fig. 1 is a front view of a special switching mechanism constituting a part of the system of the present invention, Fig. 2 is a sectional view taken about on the line 2—2 of Fig. 1, Fig. 3 is a sectional view of a detail of the switching mechanism and is taken about on the line 3—3 of Fig. 2, and Fig. 4 is a schematic showing of a system illustrating one application of the present invention.

Referring briefly to Fig. 4 of the drawings, a means for changing the value of a condition or force is herein shown as comprising a warm air furnace, generally indicated at 10. The heat supplied to the warm air furnace is controlled by means of an electrically operated gas valve, generally indicated at 11, which controls the flow of gas through a gas supply pipe 12 to the furnace 10. A mechanism responsive to changes in the stored energy of the condition or force changing means 10, in this case a slip friction bonnet thermostat, is generally indicated at 13, while a device responsive to a condition or force the value of which it is desired to control in this case a room thermostat, is generally indicated at 14.

Turning now to Figs. 1, 2 and 3, the mechanism 13 includes a circular casing 15 which supports the remaining parts now to be described. A cylindrical member 16, located at the back of casing 15, is provided with a reduced portion 17 which extends through a spacer or washer 18 as well as the back of casing 15 and terminates within the casing 15. This reduced portion 17 is provided with screw threads which cooperate with a nut 19 whereby the cylindrical member 16 is firmly clamped to the casing 15 in order to prevent relative rotation between the cylindrical member 16 and the casing 15. The reduced portion 17 is preferably provided with a longitudinal slot 20 which receives tongues 21 and 22 formed by the openings in the spacer 18 and the casing 15 through which the reduced portion 17 passes. The rear extremity of cylindrical member 16 is provided with a reduced portion 23 which extends within one end of tubular member 24. Intermediate the ends of the tubular member 24, its surface is punched inwardly to form a pair of inwardly extending flanges 25 and 26. Flange 25 is provided with an opening which receives a torsion rod 27 and thereby acts as a bearing therefor. The other flange 26 limits longitudinal movement of torsion rod 27 in one direction. The torsion rod 27 extends through suitable openings provided in cylindrical member 16 and nut 19 and terminates within the casing 15. A securing member 28 is secured to torsion rod 27 at a point between flanges 25 and 26 in any suitable manner such as by soldering. This securing member 28 by abutment with the face of flange 25, limits longitudinal movement of torsion rod 27 in the other direction whereby the torsion rod 27 may move a small amount longitudinally but excessive longitudinal movement thereof is prohibited. One end of a helically coiled bimetallic element 29 is secured to tubular member 24 near its outer extremity by a screw 30 and the other end of this bimetallic element 29 is secured to securing member 28 as by means of a screw 31.

With the parts thus far described, it will be noted that one end of bimetallic element 29 is held immovable since it is fastened to the tubular member 24 and the other end thereof, which is free to rotate, is secured to torsion rod 27, whereby torsion rod 27 will be rotated conformably to temperature fluctuations of the medium to which bimetallic element 29 is subjected.

The nut 19 is provided with a first reduced portion 32 and with a second externally screw threaded reduced portion 33. A friction plate 34 is provided with an opening which receives the reduced portion 32 and is pressed against the shoulder formed in nut 19 by means of a nut 35 which cooperates with the screw threads formed on the reduced portion 33. A spring washer 36 is interposed between nut 35 and friction plate 34 and the nut 35 is turned down on the screw threads of reduced portion 33 only sufficiently to cause the spring washer 36 to lightly press friction plate 34 against the shoulder formed in nut 19. In this manner, the friction plate 34 is normally frictionally maintained in any position to which it is moved but it can be moved to new positions by overcoming this light frictional force. The friction plate 34 is preferably given additional stability by means of a guiding member 37 which is secured to the rear of casing 15 and cooperates with an opening 38 formed in friction plate 34. A pair of contact posts 38 and 39 are carried by friction plate 34 through suitable insulating means indicated at 40, whereby the contact posts 38 and 39 are electrically insulated one from another as well as from the friction plate 34. The contact post 38 carries an adjustable contact screw 41 and the contact post 39 carries an adjustable contact screw 42.

A carrier of insulating material indicated at 43 is secured to that extremity of torsion rod 27 which terminates within the casing 15 by any suitable means such as the screw 44. This insulating carrier 43 is substantially cylindrical but is provided with a downwardly extending portion 45. On one side of this downwardly extending portion 45 is located a switch blade assembly comprising a flexible contact arm 46 and a stiff backing arm 47. A similar switching blade assembly is located at the other side of downwardly extending portion 45 and comprises a flexible switch arm 48 and a stiff backing arm 49. These switch blade assemblies are secured to downwardly extending portion 45 by any suitable means such as the rivet 50, suitable insulating washers 51 and 52 being associated therewith so that the two switch blade assemblies are electrically insulated one from another. The free ends of flexible blades 46 and 48 are normally spaced from the associated stiff backing blades 47 and 49.

Upon a fall in the temperature to which the bimetallic element 29 is subjected, flexible blade 46 first engages contact screw 42. As the temperature continues to fall, the flexible blade 46 flexes and allows flexible blade 48 to engage contact screw 41. Upon further temperature fall, the stiff backing blade 47 engages flexible blade 46 so that upon further temperature fall, the friction plate 34 is rotated in clockwise direction as viewed in Fig. 1. Upon temperature rise, flexible blade 48 first disengages contact screw 41 and thereafter flexible blade 46 disengages contact screw 42. Upon further temperature rise, stiff backing blade 47 engages a stop 53 carried by friction plate 34 so that if the temperature continues to rise, the friction plate 34 will be moved in a counterclockwise direction as viewed in Fig. 1. It will therefore be evident that the switches contained in the mechanism 13 are operated upon reversals in temperature conditions rather than at any definite temperature values. The bimetallic element 29 therefore responds to or is a measure of the stored heat in the warm air furnace 10 and the mechanism 13 responds to changes in such stored heat rather than to definite stored heat values.

Where the mechanism 13 is used in conjunction with a warm air furnace, the thermostatic element 29 is preferably enclosed by a tubular member 54 which slides over the cylindrical member 16. The outer extremity of tubular member 54 is preferably provided with a flange or spacer 55 that serves to properly position the outer extremity of tubular member 54 and maintain its inner surface out of contact with the coils of coiled thermostatic element 29. The tubular member 54 is provided with openings 56 by means of which air can circulate therethrough and into contact with the thermostatic element 29. A mounting collar 57 surrounds tubular member 54 and is clamped to cylindrical member 16 by means of a screw 58 which passes through tubular member 54 and cooperates with a circumferential slot 59 formed in cylindrical member 16. The collar 57 is provided with a flange 60 which may be secured to the casing of a warm air furnace in the usual manner. The casing 15 can therefore be rotated until the switching mechanism contained therein is in the proper position whereupon the screw 58 may be operated to secure the casing 15 in this desired position.

The flexible arm 46 and associated stiff arm 47 are electrically connected to a binding post 61 which is carried by friction plate 34 and is suitably insulated therefrom. In a similar manner, flexible arm 48 and stiff arm 49 are electrically connected to a binding post 62 which is also carried by and insulated from friction plate 34.

Returning now to Fig. 4 of the drawings, the condition or force responsive device, generally indicated at 14, is herein shown as comprising a space or room temperature responsive thermostatic switching mechanism which includes a coiled bimetallic element 65. One end of bimetallic element 65 is secured to a relatively stationary post 66 and the other end thereof carries a contact arm 67. Three other contact arms 68, 69 and 70 are carried in spaced relation to the contact arm 67 and to each other by suitable spacing means 71, 72 and 73. The spacing means 71, 72 and 73 are of electrical conducting material whereby all of the switch arms 67, 68, 69 and 70 are electrically interconnected. When the temperature to which bimetallic element 65 responds lowers, switch arm 67 first engages a contact 74, then switch arm 68 engages a contact 75, thereafter switch arm 69 engages a contact 76 and finally switch arm 70 engages a contact 77. Upon a rise in the temperature to which bimetallic element 65 responds, the switch arms 70, 69, 68 and 67 sequentially disengage their respective cooperating contacts 77, 76, 75 and 74 in the order named.

The electrically operated gas valve, generally indicated at 11, includes a valve stem 80 which is adapted to be lifted to open the valve upon energization of an electromagnetic winding 81. Lifting of valve stem 80 and opening of the valve also causes movement of a switch arm 82 into engagement with a contact 83. Such valves are well-known and this particular valve may well take the detailed form shown in Frederick S. Denison Patent No. 1,607,392 which issued November 16th, 1926.

Low voltage electrical power is supplied by means of the low voltage secondary 84 of a step down transformer 85 which has a high voltage primary 86 connected to suitable line wires 87. The remaining circuit connections will be described in detail under the heading "Operation".

*Operation*

With the parts in the position shown, the space or room temperature is at or above that desired inasmuch as all of the switches controlled by bimetallic element 65 are in open position. The bonnet temperature of the furnace 10 has recently been increased as indicated by the fact that flexible arms 46 and 48 are both disengaged from their respective contacts 42 and 41. The gas valve 11 is therefore closed. As a result, the space or room temperature will decrease sooner or later and bimetallic element 65 will first bring switch arm 67 into engagement with contact 74 and then bring switch arm 68 into engagement with contact 75 as heretofore explained. Likewise, the bonnet temperature will decrease and flexible arms 46 and 48 will be sequentially brought into engagement with their cooperating contacts 42 and 41 as heretofore explained. Gas valve 11 remains deenergized until all four of these switches have been closed at which time the electromagnetic winding 81 is energized by a circuit which is as follows: secondary 84, wire 88, wire 89, arm 46, contact 42, wire 90, contact 74, blades 67 and 68, wire 91, contact 41, arm 48, wire 92, wire 93, wire 94, electromagnetic winding 81 and wire 95 to the other side of secondary 84. Energization of electromagnetic winding 81 opens gas valve 11 and closes the holding switch comprising switch arm 82 and contact 83. Closure of this holding switch establishes a holding circuit for electromagnetic winding 81 which is independent of arm 48 and contact 41 and which is also independent of switch arm 68 and contact 75. This holding circuit is as follows: secondary 84, wire 88, wire 89, arm 46, contact 42, wire 90, contact 74, switch arm 67, thermal element 65, wire 96, contact 83, switch arm 82, wire 97, wire 94, electromagnetic winding 81 and wire 95 to the other side of the secondary 84.

Opening of gas valve 11 causes heat to be supplied to the furnace 10 which, in turn, supplies this heat to the room or space to be heated. The bonnet temperature of the furnace 10 will increase relatively quickly and arm 48 will first disengage contact 41 to interrupt the initial energizing circuit for the valve 11. However, the valve remains energized by means of the holding circuit above described. After a short time, the bonnet temperature will have increased sufficiently to move arm 46 from engagement with contact 42. This interrupts the holding circuit and the valve 11 being deenergized moves to closed position. No further heat is supplied to furnace 10 but, as is well-known in the art, the bonnet temperature will continue to rise somewhat, a characteristic sometimes referred to as over-shooting, due to the heat stored in the furnace 10. This rise or overrun may not be sufficient to move stiff blade 47 into engagement with stop 53. If the overrun in the particular furnace is not sufficient to give this result, friction plate 34 will not be moved and the bonnet temperature will begin to fall. During this time, due to the lag inherent in all heating systems, only part of the heat generated in furnace 10 will have been delivered to the room or space heated and this heat probably will not be sufficient to move either of switch arms 68 or 67 from engagement with their respective contacts 75 and 74.

It will be evident that if the overrun is not sufficient to cause movement of friction plate 34, upon subsequent decrease in the bonnet temperature, the blades 46 and 48 will engage contacts 42 and 41 at substantially the same temperature at which the gas valve 11 was previously opened. When this occurs, the gas valve 11 will again be energized by the initial energizing circuit above described whereupon the above mentioned holding circuit will again be established and further heat will be supplied to the furnace 10. Therefore, the valve 11 will be intermittently energized under the control of the bonnet temperature responsive switching mechanism whereby the heating periods of the furnace are broken up so as to give the heat developed during each heating period time to be delivered to the room or space being heated and slightly warm the same. As a result, the room or space temperature will be slowly restored so as to move switch arms 68 and 67 from engagement with contacts 75 and 74 and render the bonnet temperature switching mechanism incapable of opening the gas valve or maintaining the same open.

By reason of this breaking up of the firing periods during the time that the room thermostat is calling for heat, the room temperature will be slowly restored and the bonnet temperature will be maintained within a definite limit in relation to that bonnet temperature at which the room thermostat initially called for heat, so that under even the most disadvantageous conditions the bonnet temperature will not be extremely high and the heat stored in the furnace 10 will be relatively small at the time the room temperature is restored to the desired value. It therefore follows that the residual heat left in the furnace 10 at the time the room temperature reaches the desired value is not sufficient to cause any appreciable over-shooting in the room temperature whereby the system of the present invention is inducive of closer temperature control.

If the over-shooting in the bonnet temperature is relatively great upon closure of gas valve 11, and this may well happen in slowly reacting systems such as any coal-fired system, for example, it will cause stiff blade 47 to engage stop 53 and rotate friction plate 34 a small amount in counter-clockwise direction as viewed in Fig. 1. In such a case, the blades 46 and 48 will thus engage their respective contacts 42 and 41 at successively higher temperatures for each and every cycle of the bonnet temperature switching mechanism after the room thermostat initially calls for heat with the result that the bonnet temperature may gradually increase.

Regardless of whether the over-shooting in bonnet temperature is or is not large enough to cause this gradual increase in the bonnet temperature, it will be noted that heat is generated in the furnace 10 intermittently or in cycles during the time the room thermostat is calling for heat. In other words, while the room thermostat is calling for heat, there are means associated with the room thermostat for breaking up the generation of such heat in either event.

As above pointed out, this intermittent generation of heat gives the heat thus generated time to be delivered to the room or space so that when the room or space temperature is finally restored, there will only be a relatively small amount of heat still remaining in the furnace as compared to what would remain in a system wherein heat is continuously generated during a call for heat by the room thermostat, whereby over-shooting in room temperature, if any, will be greatly reduced. Thus the system of this invention is particularly effective when used with hot water for instance, which is well-known to be particularly sluggish in its action, and to inherently produce considerable undesirable over-shooting in room temperatures.

It will be appreciated that under certain conditions it may be desirable to have the furnace operate continuously. For instance, if there is a rapid fall in outdoor temperature or if the room thermostat setting is lowered at night and then again raised in the morning, continuous generation of heat in the furnace 10 may be necessary in order to at least partially restore the room temperature in a relatively short time. This could not be accomplished by the intermittent operation allowed by the mechanism thus far described.

Under such conditions, the abnormally low room or space temperature will cause switch arms 69 and 70 to sequentially engage their respective contacts 76 and 77 to energize electromagnetic winding 81 as follows: secondary 84, wire 88, wire 98, contact 76, switch arm 72, switch arm 70, contact 77, wire 99, wire 93, wire 94, electromagnetic winding 81 and wire 95 to the other side of secondary 84. The gas valve 11 will thereupon be opened and the holding switch will be closed so as to establish the following holding circuit: secondary 84, wire 88, wire 98, contact 76, switch arm 72, bimetallic element 65, wire 96, contact 83, switch arm 82, wire 97, wire 94, electromagnetic winding 81 and wire 95 to the other side of secondary 84. It will be noted that this second energizing circuit and this second holding circuit are both entirely independent of the bonnet temperature responsive switching mechanism 13. Therefore, upon abnormal room temperatures, the furnace 10 can be operated continuously irrespective of the bonnet temperature. Of course, for ultimate safety, such a system should employ the well-known high limit control and safety pilot (not shown) by means of which excessive bonnet temperatures are prevented and all operation is prevented if the pilot becomes extinguished as is common practice in the heating art.

The bonnet temperature will therefore undoubtedly increase considerably with the result that stiff blade 47 will rotate friction plate 34, by engagement with stop 53, through a considerable distance in counter-clockwise direction as viewed in Fig. 1. Now upon partial restoration of room temperature, switch arm 70 will first disengage contact 71 to interrupt this second energizing circuit. The gas valve will remain energized however until a further rise in room temperature causes contact arm 69 to disengage its cooperating contact 76. When this occurs, the second holding circuit heretofore explained will be interrupted and the gas valve 11 will be deenergized. The bonnet temperature is now quite high but immediately upon a small drop in bonnet temperature, blades 46 and 48 will again engage their respective contacts 42 and 41 since the bonnet temperature responsive switching mechanism operates upon reversals in bonnet temperature rather than upon any definite bonnet temperature. If, at this time, the room temperature has not been completely restored so that switch arms 68 and 67 are still engaged with their cooperating contacts 75 and 74, the bonnet control will intermittently operate the gas valve 11 to maintain the bonnet temperature within the same temperature range as heretofore described but the actual bonnet temperature maintained will be considerably higher. This will continue until the room temperature is restored whereupon the gas valve 11 cannot be operated by the bonnet temperature switching means.

From the above description, it will be noted that the bonnet temperature responsive switching mechanism will always attempt to maintain substantially that bonnet temperature which prevailed at the time that the room temperature became substantially that desired although in some systems there will be a tendency for the bonnet temperature to creep up. In other words, at high room temperature the heating device is rendered inoperative. At intermediate room temperatures, the heating device is operated intermittently under the control of the mechanism responsive to the heat stored up in the heating device so as to try to maintain that amount of stored heat which prevailed in the heating device at the time the room temperature became intermediate and, at low room temperatures, the heating device will be operated continuously irrespective of the change in the stored heat except when such stored heat becomes so high as to be dangerous.

It will be apparent that the system of the present invention may be applied to many types of heating systems other than the warm air system herein described. In fact, the system of the present invention is applicable to temperature control systems of all sorts whether they be heating systems or cooling systems and is also applicable to the control of any condition or force which it is desired to maintain at some predetermined value. The system of the present invention has particular utility in the control of a condition or force by means of a system in which there is an inherent lag between the initiation of an operation to restore the condition or force and the actual restoration of this condition or force.

I claim:

1. In a temperature changing system, in combination, a thermal element; first and second switches sequentially closed thereby upon a change in one direction only of the temperature to which said element responds; a temperature changer; electromagnetic means associated therewith for operating the temperature changer at maximum or minimum capacity when the electromagnetic means is respectively energized or deenergized; a holding switch closed by said electromagnetic means when energized, third and fourth switches sequentially closed upon a predetermined lowering in the heat content of said temperature changer and independent of the actual value of the heat content; an energizing circuit for said electromagnetic means including said second and fourth switches in series; and a holding circuit for said electromagnetic means including said first, third and holding switches in series.

2. In a heating system, in combination, a heater for heating a space, a thermal element, first and second switches sequentially closed thereby upon temperature fall, an electromagnetic device for operating said heater at maximum capacity when energized, a holding switch moved to closed position upon energization of said electromagnetic device, third and fourth switches sequentialy moved to closed position upon a predetermined decrease in the value of a condition directly produced by said heater, an energizing circuit for said electromagnetic device controlled by said second and fourth switches in series, and a holding circuit for said electromagnetic device controlled by said first, third and holding switches in series.

3. In a heating system; in combination; a heater; first and second switches sequentially closed upon a predetermined decrease in the value of a condition directly produced by said heater; third, fourth, fifth and sixth switches moved to closed position at predetermined spaced values during decrease of a condition produced less directly by said heater; an electromagnetic device; a holding switch; connections between said heater, holding switch and electromagnetic device for operating the heater at maximum capacity and for closing said holding switch only when said electromagnetic device is energized; a first energizing circuit for said electromagnetic device controlled by said second and fourth switches in series; a first holding circuit for said electromagnetic device including said first, third and holding switches in series; a second energizing circuit for said electromagnetic device controlled by said sixth switch; and a second holding circuit for said electromagnetic device controlled by said fifth and holding switches in series.

THOMAS F. CAMPBELL.